Figure 3:
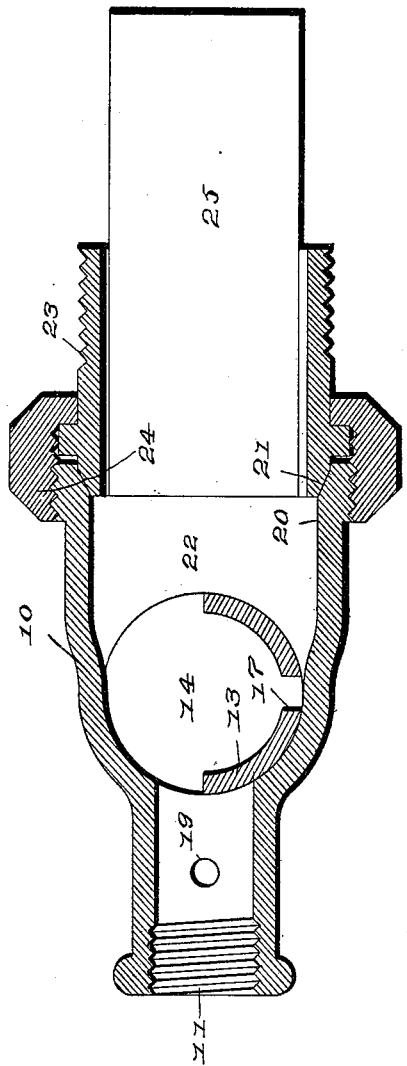

No. 659,050. Patented Oct. 2, 1900.
J. COLLIS.
CIRCULATING VALVE.
(Application filed Dec. 1, 1899.)
(No Model.) 2 Sheets—Sheet 1.
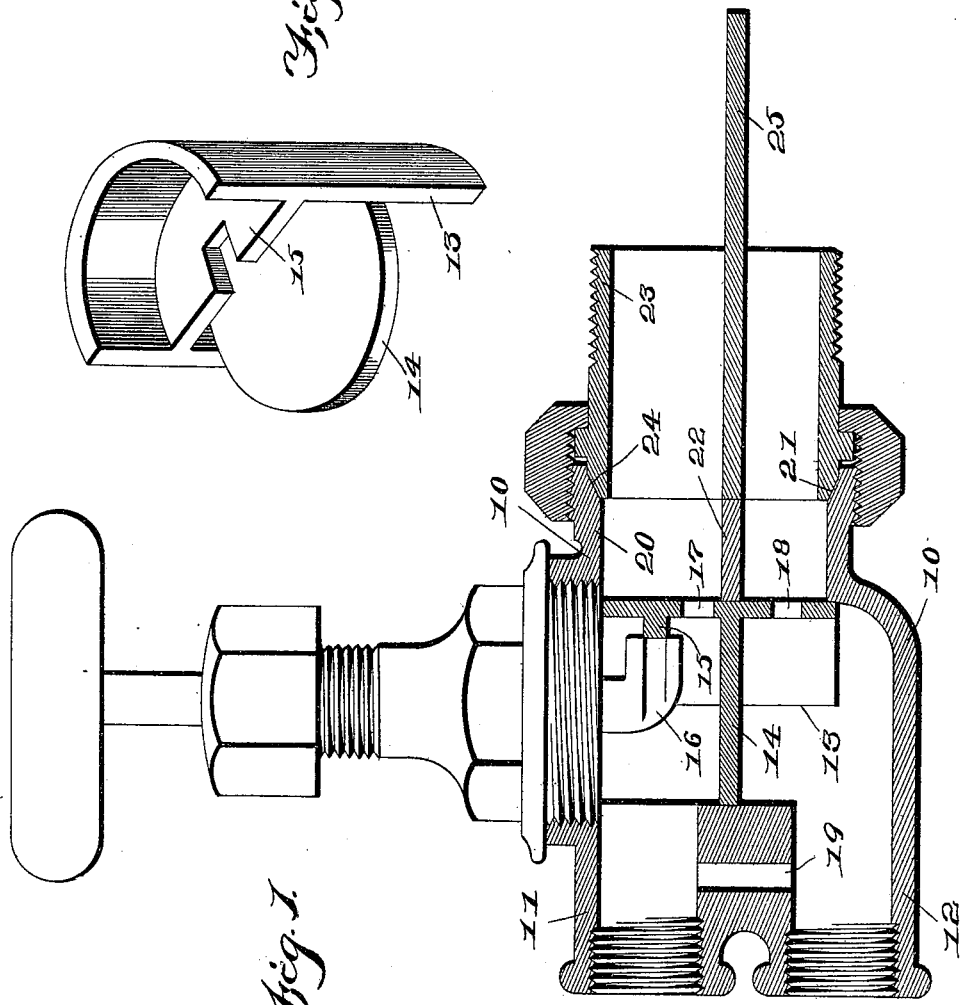
Witnesses:
R. D. Orvig.
F. C. Stuart
Inventor
John Collis
By J. Ralph Orvig, Atty.
THE NORRIS PETERS CO., PHOTO-LITHO., WASHINGTON, D. C.

No. 659,050. Patented Oct. 2, 1900.
J. COLLIS.
CIRCULATING VALVE.
(Application filed Dec. 1, 1899.)
(No Model.) 2 Sheets—Sheet 2.

Witnesses:
R.G. Orwig.
F.C. Stuart

Inventor John Collis,
by J. Ralph Orwig, Atty.

UNITED STATES PATENT OFFICE.

JOHN COLLIS, OF DES MOINES, IOWA, ASSIGNOR TO WILLIAM P. COLLIS, OF NEW YORK, N. Y.

CIRCULATING-VALVE.

SPECIFICATION forming part of Letters Patent No. 659,050, dated October 2, 1900.

Application filed December 1, 1899. Serial No. 738,935. (No model.)

*To all whom it may concern:*

Be it known that I, JOHN COLLIS, a citizen of the United States, residing at Des Moines, in the county of Polk and State of Iowa, have invented a new and useful Circulating-Valve, of which the following is a specification.

The object of my invention is to provide an improved circulating-valve especially adapted for use in connection with hot-water radiators and which is designed to separate the inflowing hot water from the outgoing water of lower temperature, and hence greater specific gravity, so that they will not commingle in the valve nor retard the flow of either of said currents of water nor commingle the cooled water with the hot in the valve, thus preventing the return of some cooled water with the current of hot water through the radiator, and, further, to provide for continuous circulation through the pipes leading to and from the radiator when the valve is closed, so that other radiators in the system may operate unimpaired by one that is temporarily cut out.

My object is further to provide for a slight continuous flow through the radiator when the valve is closed to thereby supply sufficient heat to the radiator to prevent freezing.

My invention consists in certain details in the construction, arrangement, and combination of the various parts of the valve, as hereinafter more fully set forth, pointed out in my claims, and illustrated in the accompanying drawings, in which—

Figure 1 shows the complete valve-casing, valve, and coupling in longitudinal section. Fig. 2 shows in perspective the valve detached, and Fig. 3 is a horizontal sectional view taken on a line above the disk of the valve.

Referring to the accompanying drawings, I have used the reference-numeral 10 to indicate the valve-casing. At one end of the casing is the induction-opening 11 and the eduction-opening 12, both leading to the chamber for containing the valve, which is located in about the central portion of the valve-casing. In this valve-chamber the valve proper is located. This valve comprises a semicircular portion 13, having near its central portion an integral disk 14 of a size to exactly fit the interior of the valve-chamber. Above the disk 14 is a semicircular cross-piece 15, to which the valve-stem (indicated by the numeral 16) is detachably connected, and at or near the central portion of the part 13 is a small opening 17 above the disk 14 and a similar opening 18 below the disk 14 for purposes hereinafter made plain. In the partition between the induction and eduction openings 11 and 12 I have provided a small passage-way 19. At the end of the valve-chamber opposite from the induction and eduction openings is a tubular extension 20, having a beveled ground surface at 21 and a screw-thread on its exterior, and a slight distance below its central portion is an integral horizontal partition 22, arranged in position substantially in alinement with the disk 14.

The coupling of the pipe (indicated by the numeral 23) is provided with a ground-surface at 24 to mate with the ground-surface 21, and the sliding collar 24 of this coupling is screw-threaded on its interior to coact with the screw-thread on the exterior of the extension 20. On the interior coupling 23 is a horizontal partition 25, formed integrally therewith and extending a considerable distance beyond the coupling. Said partition is designed when the coupling is securely attached to the extension on the valve-chamber to assume a position in alinement with the partition 22.

In practical use, and assuming that inflow and outflow pipes were connected with the passage-ways 11 and 12 and that the coupling 23 was screwed into a radiator, it is obvious that when the valve is opened the hot water will flow through the valve-chamber and into the radiator above the disk 14, partition 22, and the partition 25, and then, after passing through the radiator and becoming somewhat cooled, it is obvious that the return water from the bottom of the radiator will flow back below the said partitions and disk through the opening 12, and obviously these two currents of water will not be commingled nor the flow of hot water to the radiators be impeded by friction with the returning flow of cold water, and, further, assuming that the valve was closed, it is obvious that a slight circulation of water through the pipes in the system may be maintained through the opening 19. It will also be seen that by reason of the openings 17 and 18 in the valve a slight flow of water will be maintained at all times through the radiator, thus preventing the water in the radiator from freezing without to any great extent heating the radiator. It is also obvious that when connecting my device with a radiator the partitions 22 and 25 may readily be made to aline, because the coupling-pipe 23 is first screwed into the radiator, and it is turned far enough to bring the partition 25 to a horizontal position. Then, as the valve-chamber must necessarily extend in such a position that the partition 22 therein will extend in a horizontal plane, these partitions must necessarily be in such positions as to form continuous passage-ways above and below them.

Having thus described my invention, what I claim, and desire to secure by Letters Patent of the United States therefor, is—

1. The combination, with a valve-chamber having induction and eduction openings at one end, arranged the one above the other, and a tubular extension at the other end, of a semicircular valve in the valve-chamber, a disk-shaped partition secured to the semicircular valve, a valve-stem connected with the valve, and a partition in the tubular extension, arranged substantially in alinement with the said disk-shaped partition, for the purposes stated.

2. The combination with a valve-chamber having induction and eduction openings at one end, arranged the one above the other, and also having passage-ways between said openings, and a tubular extension at the other end, of a semicircular valve or valve-chamber, a disk-shaped partition secured to the semicircular valve, a valve-stem connected with the valve and a partition in the tubular extension, arranged substantially in alinement with the said partition for the purposes stated.

3. The combination, with a valve-casing having induction and eduction openings at one end and a tubular extension at the other end, of a semicircular valve in the casing, a disk-shaped partition connected with the valve, a horizontal partition in the said tubular extension, and a coupling-pipe designed to be connected with said tubular extension and a horizontal partition in said coupling-pipe to project beyond it and designed to aline with the partition in the tubular extension, for the purposes stated.

4. The combination with a valve-casing having induction and eduction openings at one end and a tubular extension at the other end, of a semicircular valve in the casing, a disk-shaped partition connected with said valve, said valve being provided with a passage-way above and a passage-way below the said disk-shaped partition, for the purposes stated.

5. An improved circulating-valve, comprising in combination a casing, induction and eduction pipes admitted into one end of the casing the one above the other, a horizontal partition in the casing to separate the induction and eduction pipes, a tubular extension at the opposite end of the casing, a horizontal partition in said tubular extension, and a valve located between the said partitions and arranged to be capable of cutting off the flow above and below said partitions when closed, and for permitting the flow above and below said partitions when open, and a partition connected with the valve for cutting off communication between the upper and lower chambers when the valve is either open or closed, substantially as, and for the purposes stated.

6. The combination with a valve-casing having at one end induction and eduction openings, and at the other end a tubular extension, of a horizontal partition in the said tubular extension, a valve in the casing, and a partition connected with said valve, said partition being designed to aline with the aforesaid partition when the valve is open to form continuous passage-ways through the valve-chamber above and below the said partitions, for the purposes stated.

JOHN COLLIS.

Witnesses:
J. RALPH ORWIG,
THOMAS G. ORWIG.